US010007027B2

(12) United States Patent
Clark

(10) Patent No.: US 10,007,027 B2
(45) Date of Patent: Jun. 26, 2018

(54) HAND HELD STORM DETECTOR

(76) Inventor: E. Philip Clark, Darlington, IN (US)

(*) Notice: Subject to any disclaimer, the term of this patent is extended or adjusted under 35 U.S.C. 154(b) by 1178 days.

(21) Appl. No.: 13/174,726

(22) Filed: Jun. 30, 2011

(65) Prior Publication Data
US 2013/0002437 A1 Jan. 3, 2013

(51) Int. Cl.
G01W 1/00 (2006.01)
(52) U.S. Cl.
CPC .................... G01W 1/00 (2013.01)
(58) Field of Classification Search
CPC ........................................ G01W 1/00
USPC .......................................... 340/601
See application file for complete search history.

(56) References Cited

U.S. PATENT DOCUMENTS

| 2,418,834 A * | 4/1947 | Hartman ................ 434/243 |
| 3,664,292 A * | 5/1972 | Sherman ................ 116/317 |
| 4,139,951 A * | 2/1979 | Cunard et al. ............ 33/362 |
| 4,505,048 A | 3/1985 | Sharp |
| 4,899,453 A * | 2/1990 | Bhat et al. ............... 33/348 |
| 5,517,430 A * | 5/1996 | Lewis ................... 702/150 |
| 5,931,110 A * | 8/1999 | Yamamoto ............ 114/144 E |
| 6,212,476 B1* | 4/2001 | Noy et al. ................. 702/9 |
| 6,215,294 B1 | 4/2001 | Coleman |
| 6,285,298 B1* | 9/2001 | Gordon ................... 340/945 |
| 6,701,631 B1* | 3/2004 | Monteiro et al. ........... 33/1 E |
| 7,327,271 B2* | 2/2008 | Greenstein et al. ....... 340/601 |
| 2003/0169335 A1* | 9/2003 | Monroe ................. 348/143 |
| 2006/0195254 A1* | 8/2006 | Ladetto et al. ........... 701/207 |

FOREIGN PATENT DOCUMENTS

GB 666310 2/1952

* cited by examiner

Primary Examiner — Mohamed Barakat
(74) Attorney, Agent, or Firm — C. John Brannon; Brannon Sowers & Cracraft PC

(57) ABSTRACT

An apparatus for detecting a storm, including a partially transparent housing defining a cavity and a suspended magnetic element positioned within the cavity. The magnetic element is rotatable in a first plane and pivotable in second plane and third planes, wherein the second plane is perpendicular to the first plane and the third plane is perpendicular to the first plane and perpendicular to the second plane. A rapid pivot of the magnetic element away from the pull of gravity signals a close proximity of a storm. A first sensor operationally connected to the magnetic element for measuring the deflection of the magnetic element, dampening fluid substantially fills the cavity, a second sensor positioned within the housing for measuring the degree to which the magnetic element is level, and a laser operationally connected to the magnetic element and positioned to emit a beam of light corresponding to the orientation of the magnetic element.

20 Claims, 5 Drawing Sheets

HAND HELD STORM DETECTOR

TECHNICAL FIELD

This novel technology relates generally to the field of meteorology, and, more particularly, to a portable device for ascertaining the direction of an approaching storm.

BACKGROUND

Storms are responsible for a great deal of property damage, and, more importantly, injury and loss of life. This is due in part to the ability of storms to suddenly occur without much warning. While radar has proven to be a good way of locating and tracking storms, radar weather reporting relies on electronic media to generate and receive the weather report. Often, those in storm zones find themselves without the electricity required to power television and radios, and thus are unable to benefit from information about an impending or ongoing storm. Thus, there is a need for a quick and simple way to identify the location of a storm, especially extreme or severe weather events such as tornados, electrical storms and the like. The present invention addresses this need.

DETAILED DESCRIPTION

Figure 1:
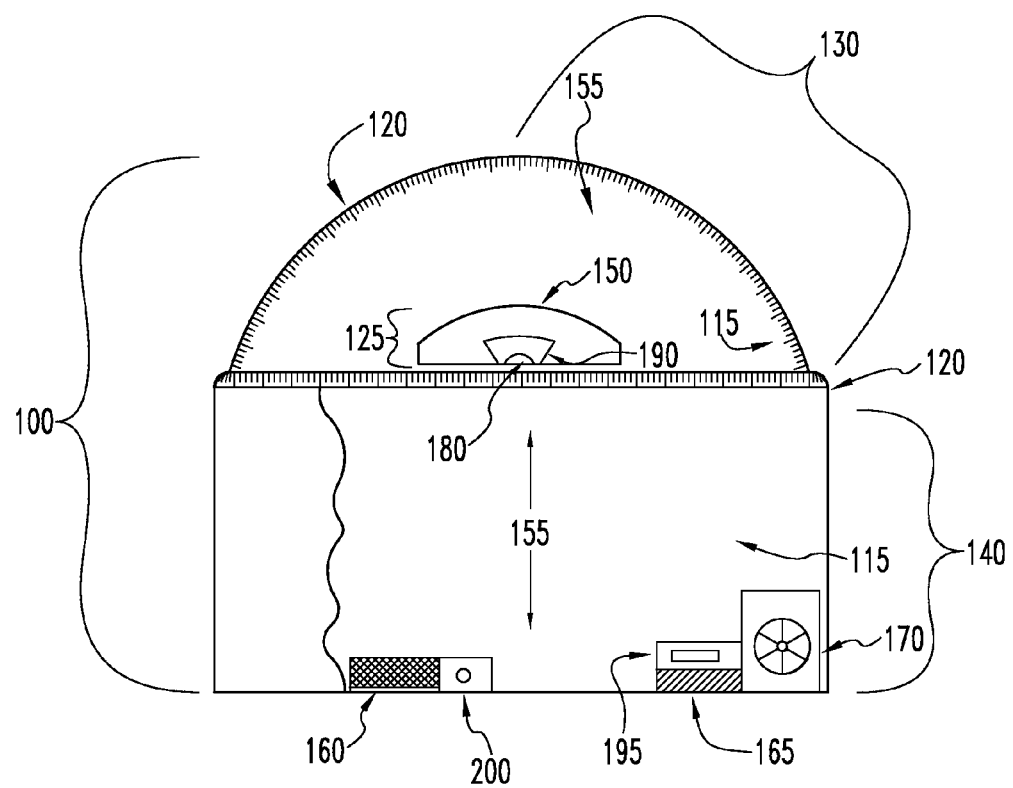
FIG. 1 is a first illustration of a portable weather detection and alarm apparatus.

For the purposes of promoting an understanding of the principles of the novel technology, reference will now be made to the embodiments illustrated in the drawings and specific language will be used to describe the same. It will nevertheless be understood that no limitation of the scope of the novel technology is thereby intended, such alterations and further modifications in the illustrated device, and such further applications of the principles of the novel technology as illustrated therein being contemplated as would normally occur to one skilled in the art to which the novel technology relates.

Figure 2:
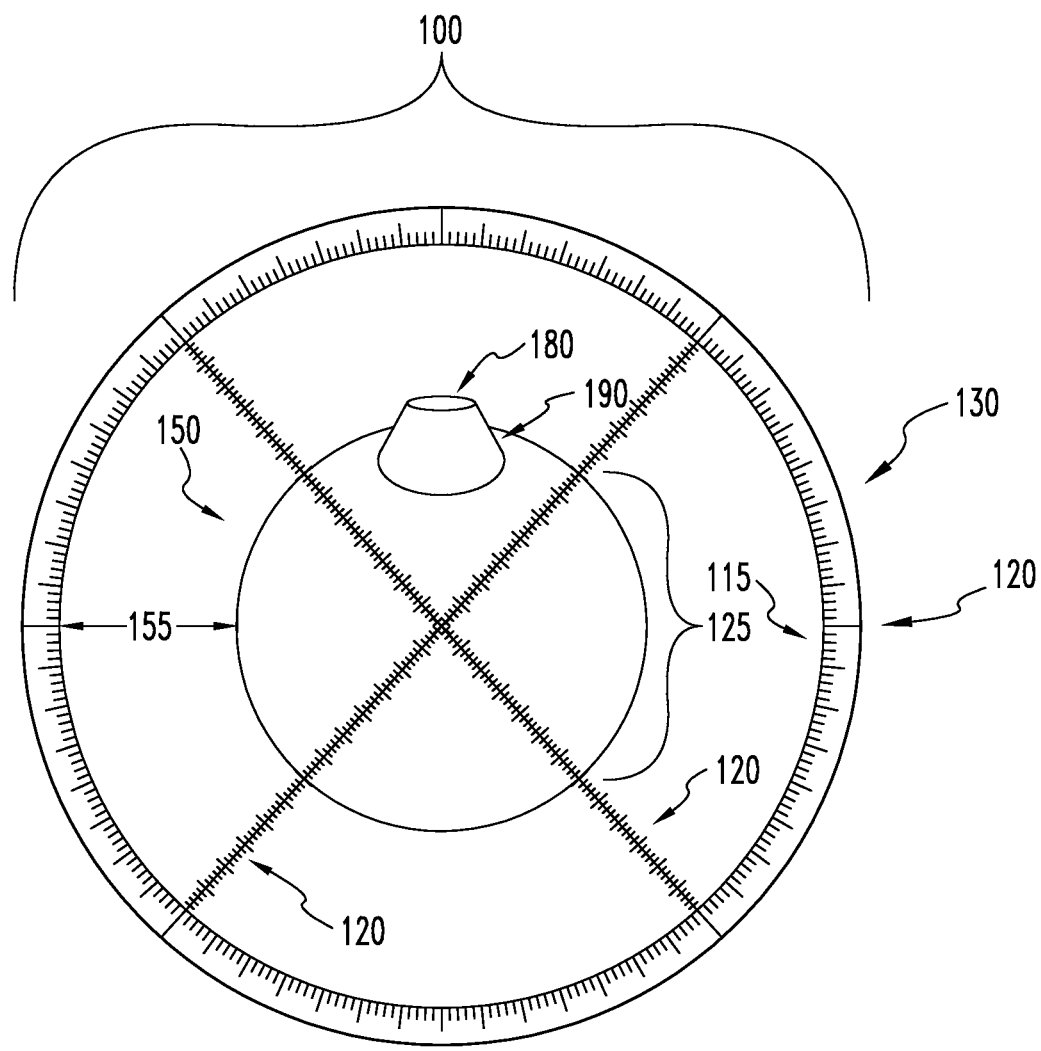
FIG. 2 is a top view illustration of a portable weather detection and alarm apparatus.
Figure 3:
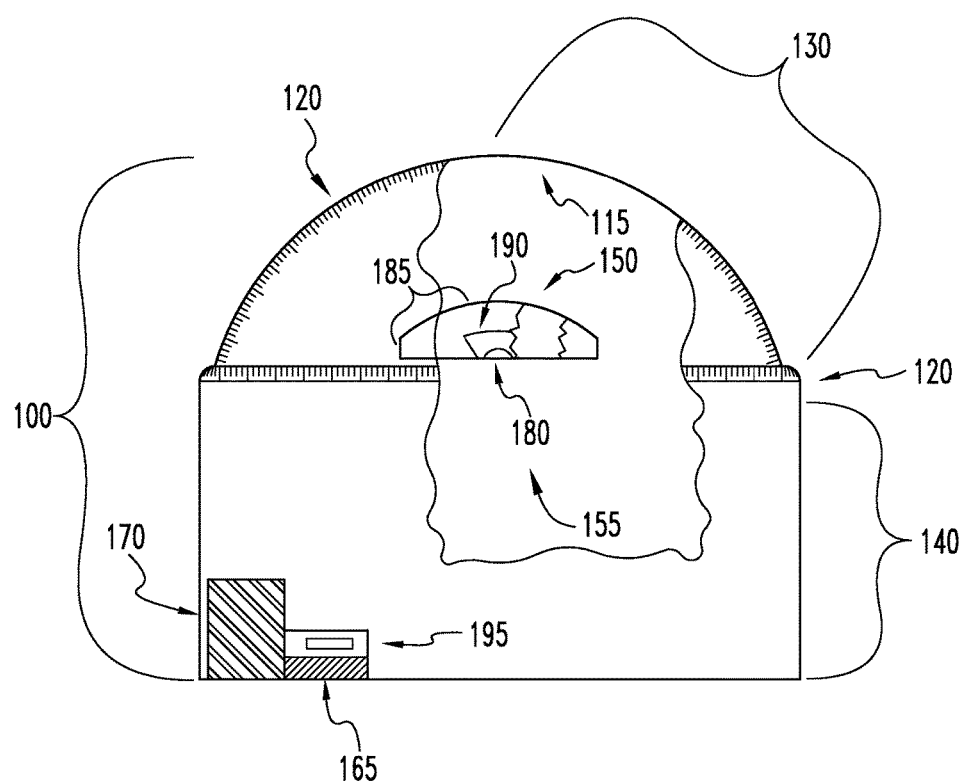
FIG. 3 is a side illustration of a portable weather magnetometer.
Figure 4:
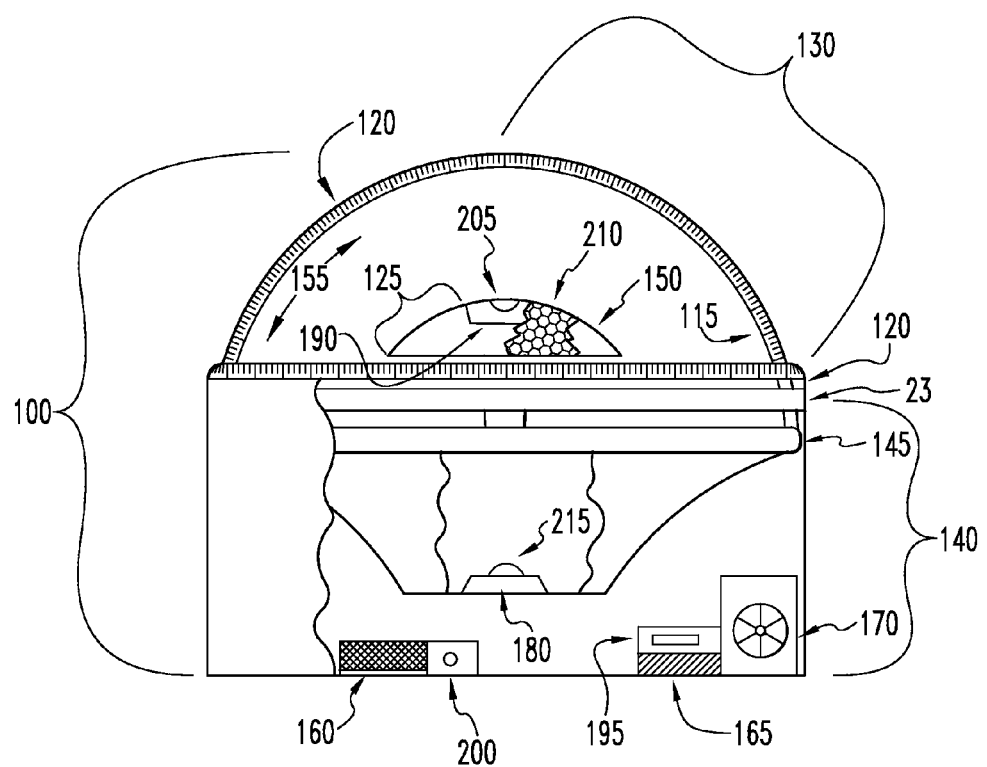
FIG. 4 is a third side illustration of the portable weather magnetometer.
Figure 5:
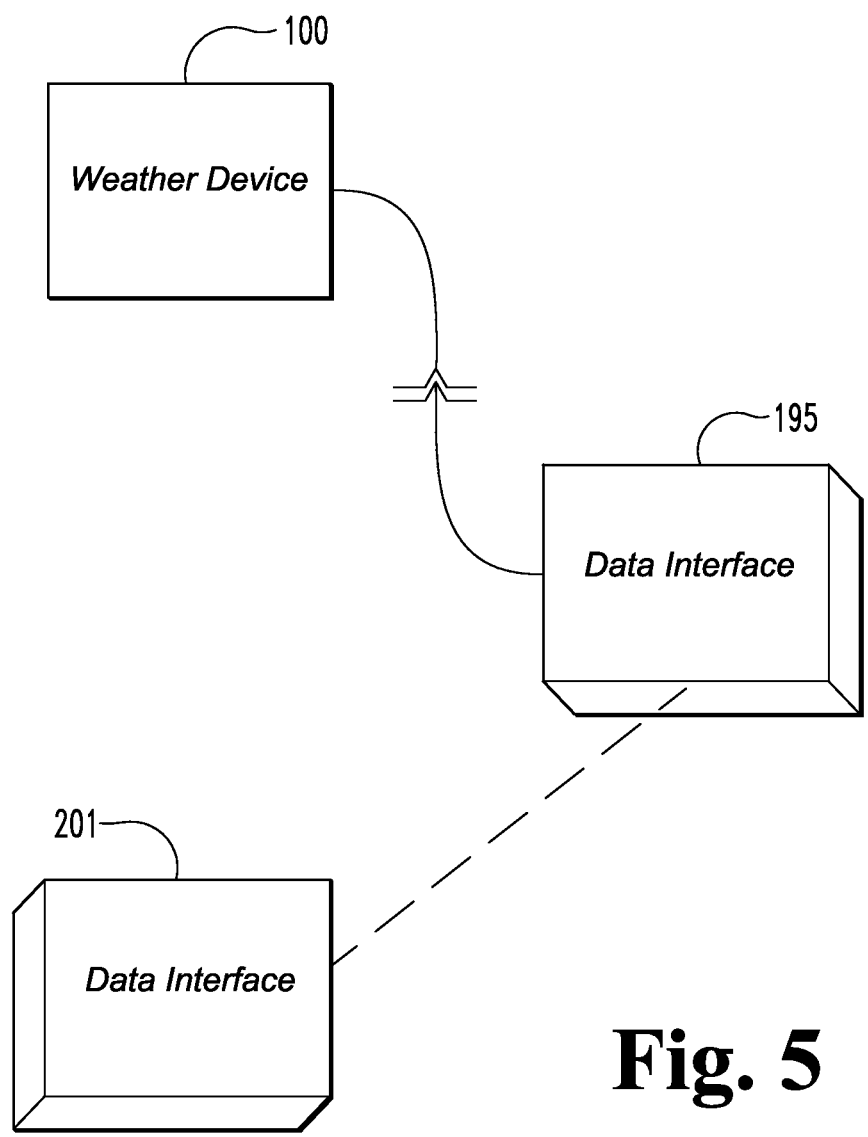
FIG. 5 is a block diagram associated with the portable weather magnetometer.

FIGS. 1-3 illustrate a first embodiment of the present novel technology, a portable storm detection device 100. As seen in FIG. 1, the portable weather detection and alarm apparatus 100 has a protective casing 130 sized to partially reside within a protective base 140. Typically, the protective casing 130 is generally spherical or hemispherical. The protective casing 130 may be permanently affixed to the protective base 140. While no practical restriction exists upon the size of the portable weather detection and alarm apparatus 100, most often the portable weather detection and alarm apparatus 100 is approximately palm size.

The protective casing 130 is typically made of a non-magnetic material, or is at least sufficiently non-magnetic to minimize interference with the apparatus' 100 function. The protective casing 130 typically has a transparent portion allowing visual inspection of the contents thereof. The protective casing 130 is typically etched with graduated vertical and horizontal markings 120. Likewise, the protective base 140 may be etched with graduated vertical and horizontal markings 120. A portion of the graduated markings may include a phosphorescent substance for ease of reading. The phosphorescent substance may assist in the use of the weather detection and alarm apparatus 100 in low light conditions.

The base 140 or other portion of the device 100 may include a sensor 145 for detecting whether the device 100 base 140 is horizontal, such as a spirit level or bubble level 145. A magnetic element 150 is typically suspended within the protective case 130. In some embodiments, the magnetic element or member 150 is typically a slender elongated member, such as a needle having a north and a south pole; however, in other embodiments, the magnetic element 150 may be a magnetized sphere. In some implementations, the protective case 130 encloses the magnetic element 150 such that the magnetic element 150 is suspended within an airtight enclosure, while in other implementations the protective casing 130 also encloses a thermally inert dampening fluid 155. The magnetic element 150 is typically suspended such that the magnetic element 150 is freely rotatable in the horizontal plane and with one end or pole freely pivotable or moveable in a direction against the pull of gravity, such as through a vertical plane. In the case of a spherical magnetic element 150, the element may be incased in a slightly larger sphere 130 with a dampening or low friction fluid 155 filling the space therebetween.

Additionally, the suspension is such that the magnetic element 150 rests at level and in alignment with magnetic north. For example, the magnetic element 150 is freely pivotable in both the horizontal and vertical planes in response to magnetic disturbances, such as these related to weather phenomenon. In the absence of strong external magnetic fields, such as those related to a electrical storms and/or tornados, the magnetic element 150 will tend to be level and will tend to point to magnetic north.

The thermally inert dampening fluid 155 retards the pivoting of the magnetic element 150. For example, the dampening fluid 155 can lessen or slow the pivoting of the magnetic element 150 that can result from transportation of the portable weather detection and alarm apparatus 100. In some implementations, the pivoting of the magnetic element 150 is retarded through friction between the magnetic element 150 and the means of suspension of the magnetic element 150. In other implementations, the magnetic element 150 is free to pivot without retardation.

The detection device 100 may also include a sensor 160 for generating a signal in response to the speed at which the magnetic element moves and/or the force which the magnetic element exerts in response to an external magnetic field. Further, the detection device 100 may also include a global positioning system (GPS) positioning receiver 165 for ascertaining its location.

In some implementations, portions of the magnetic element 150 may be coated with a phosphorescent marking 190. The phosphorescent marking 190 corresponds to the orientation of the magnetic element 150 and can assist in the use of the weather detection and alarm apparatus 100 in low light conditions. In some implementations, a light source 180 is connected to the magnetic element 150. In these implementations, the light source 180 may be operationally connected such that the light emitted from the light source 180 corresponds to the orientation of the magnetic element 150.

In some implementations, the portable storm detection and alarm apparatus 100 can also include an alarm 170 that is operationally connected to the magnetic element 150. The alarm 170 can sound in response to excessive and/or rapid pivoting of the magnetic element 150. For example, the alarm 170 can sound when the magnetic element 150 is pivoting at a rate in excess of a predetermined threshold value.

In some implementations, the portable weather detection and alarm apparatus 100 can also include a data interface 195. The data interface 195 may be operationally connected to a recording device to enable recording of the pivoting of the magnetic element 150, signals from sensor 145, sensor 160, and the like. More typically, the data interface 195 is operationally connected to a computer, microprocessor, electronic controller or the like 200. The apparatus 100 may also include an integral microprocessor 201 operationally connected to the data interface 195, sensor 145, sensor 160, and/or the like. For example, the data interface 195 may be an interface that adheres to the Universal Serial Bus (USB) specification and enables a recording device, such as a computer, to record the pivoting or movement of the magnetic element 150. In some implementations, the data interface 195 may be memory enabled, permitting the data interface 195 to record the pivoting of the magnetic element 150 for subsequent transference to a recording device.

As seen in FIG. 3, in some embodiments the portable weather magnetometer 100 has a transparent housing 130 defining a mostly spherical interior cavity 115. The transparent housing 130 is etched with graduated markings 120. The graduated markings 120 correspond to three perpendicular axes. An indicator 125 is located within the cavity 115. In some implementations, the indicator 125 is spherical and substantially occupies the cavity 115.

The indicator 125 typically has a leveling center of gravity such that the indicator 125 is normally level with respect to the horizon. The indicator 125 also typically has a finite magnetic field and is rotatable about the three perpendicular axes. For example, the indicator 125 typically rests horizontally level and indicates magnetic north. However, when in the presence of a disturbing magnetic field, the indicator 125 is free to respond in line with the disturbing magnetic field about the three perpendicular axes.

The cavity 115 also contains a thermally inert dampening fluid 155. The dampening fluid 155 is typically lubricating and more typically has a specific gravity such that the indicator 125 is neutrally buoyant and able to freely rotate within the cavity 115.

In some implementations, the indicator 125 is also marked with a phosphorescent marking 190 in line with the indicator's magnetic field. In some implementations, the portable weather magnetometer 100 further includes an illumination source 180. In some of such implementations the indicator 125 includes a lens 205 for focusing the light source 180 upon the graduated markings 120. For example, the light from the light source 180 is focused such that the degrees of rotation achieved by the indicator 125 about the three axes are illuminated. In some implementations, the housing 130 has a focusing receptacle 215 enabling an external light source to supply the light that the lens 205 focuses upon the graduated markings 120.

In some other implementations, the light source 180 is a laser and the lens 205 comprises a beam splitter assembly 210. The beam splitter assembly 210 is capable of splitting a laser beam emitted from the light source 180 into three distinct laser beams with each of the three distinct laser beams correspond to a respective axis.

In another embodiment, two or more storm detection devices 100 may be used to measure both the direction and the movement of an extreme weather condition. Typically, a plurality of storm detection devices 100 may be connected in electric communication, such that the direction of deflection of the magnetic indicator 150, the force of deflection, and/or the speed at which the direction of deflection changes may be measured, communicated and correlated to determine the position, direction of movement, and/or speed of movement of the storm. Typically, the data interfaces 195 of each respective storm detection device 100 are operationally connected to a microprocessor 200, 201, which receives information from each respective device 100. The microprocessor 200, 201 may then calculate the position, direction of movement, and/or speed of movement relative to the devices 100 from the information received from each respective device 100. Further, if the devices are GPS 165 enabled, the exact location of the storm may be calculated.

In operation, the apparatus 100 is of a convenient shape and size such that it is easily portable for the user. The apparatus 100, once removed from its storage container or field pack, can remain readable through both day and night situations. The apparatus 100 can be held in the user's palm or, for convenience, be placed upon a surface to assess a current reading from the surrounding environment. The surface need not be level in that the apparatus self levels 100. Alternatively, the device can be mounted on the exterior or interior of a home, a cabin, or other suitable place.

The apparatus' 100 portable nature allows the apparatus 100 to be easily transported and hence used during camping and hiking. The apparatus' 100 low or no power requirements provide for the apparatus's use in post-disaster environments. For example, the apparatus 100 may supply useful information in areas where weather detection and weather warning systems are not operational or have been damaged.

Similarly, the apparatus' 100 portable and no or low power requirements allows for its use in non-magnetic craft. For example, the apparatus 100 can be used on fishing boats, canoes, rafts, and the like. Thus, the apparatus 100 provides for an extreme weather detection ability typically not present in such crafts. Additionally, the dampening fluid 155 of some implementations can minimize the interference caused by such crafts rocking and moving in response to waves or other forces.

In the absence of a weather disturbance, the apparatus 100 can be used as a compass and indicate magnetic north. However, in the presence of an extreme weather disturbance, such as a thunderstorm, electrical storm, tornado, or the like, the apparatus 100 will warn the user by the indicator 125 rapidly pivoting about one or more axes. The degree and force of pivoting corresponds to and serves to inform the user of the proximity and severity of the weather disturbance. The warning provided by the apparatus 100 can afford additional time within which a user can take actions appropriate for the weather disturbance.

In some implementations, visibility of the pivoting of the indicator 125 is further highlighted through the use of phosphorescent markings 190. Additionally, some implementations make use of light or laser light 225 to further enhance the visibility of the pivoting of the indicator 125. The laser 225 is operationally connected to the magnetic element 150 such that the laser 225 shines in the same direction that the magnetic element 150 points, and thus illuminates the direction of the storm and also makes subtle changes in direction more apparent. Finally, some implementations provide a means by which a device 200 can record the pivoting of the indicator 155.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

What is claimed is:

1. A portable weather detection and alarm apparatus comprising:
    a partially transparent housing defining a cavity; and
    a suspended magnetic element positioned within the cavity;
    wherein the magnetic element is rotatable in a first plane;
    wherein the magnetic element is pivotable in a second plane;
    wherein the second plane is perpendicular to the first plane;
    wherein the magnetic element is pivotable in a third plane;
    wherein the third plane is perpendicular to the first plane and perpendicular to the second plane;
    wherein an automatic, rapid pivot of the magnetic element away from the pull of gravity visually signals a close proximity of a storm to an observer.

2. The apparatus of claim 1, wherein the non-magnetic housing is generally spherical.

3. The apparatus of claim 1 and further comprising:
    a sensor operationally connected to the magnetic element for measuring the deflection of the magnetic element.

4. The apparatus of claim 1 and further comprising:
    dampening fluid substantially filling the cavity.

5. The apparatus of claim 1 and further comprising:
    a leveling sensor positioned within the housing.

6. The apparatus of claim 1 and further comprising:
    a laser operationally connected to the magnetic element;
    wherein the laser is positioned to emit a beam of light corresponding to the orientation of the magnetic element.

7. The apparatus of claim 1 and further comprising:
    a first sensor operationally connected to the magnetic element for measuring the deflection of the magnetic element;
    dampening fluid substantially filling the cavity;
    a second sensor positioned within the housing for measuring the degree to which the magnetic element is level; and
    a laser operationally connected to the magnetic element and positioned to emit a beam of light corresponding to the orientation of the magnetic element.

8. The apparatus of claim 7 and further comprising:
    a data port disposed in the housing and operationally connected to the first and second sensors.

9. The apparatus of claim 8 and further comprising:
    a microprocessor disposed in the housing and operationally connected to the data port.

10. The apparatus of claim 9 and further comprising a transceiver operationally connected to the microprocessor.

11. A storm detection device, comprising:
    a transparent housing defining a generally spherical cavity;
    a generally spherical magnetic member pivotably positioned within the cavity; and
    a dampening fluid substantially filling the cavity;
    wherein the generally spherical magnetic member is pivotable about three mutually perpendicular axes;
    wherein the generally spherical magnetic member has a leveling center of gravity;
    wherein the generally spherical magnetic member is neutrally buoyant in the dampening fluid;
    wherein the generally spherical magnetic member pivots in response to an oncoming storm; and
    wherein a rapid pivoting of the generally spherical magnetic member indicates proximity of a storm.

12. The apparatus of claim 11, wherein a portion of the generally spherical magnetic member is marked with a phosphorescent substance and wherein the transparent housing is etched with graduated markings.

13. The apparatus of claim 12, wherein the generally spherical magnetic member is operationally connected to a lens for focusing light on the graduated markings.

14. The apparatus of claim 11 and further comprising a light source, the light source enabled to cast a beam of light upon a portion of the protective casing.

15. The apparatus of claim 11 and further comprising:
    a first sensor operationally connected to the generally spherical magnetic member for measuring the deflection of the generally spherical magnetic member; and
    a second sensor positioned within the housing measuring the degree to which the housing is level.

16. The apparatus of claim 15 and further comprising:
    a data port disposed in the housing and operationally connected to the first and second sensors;
    a microprocessor disposed in the housing and operationally connected to the data port; and
    a transceiver operationally connected to the microprocessor.

17. A method for detecting an approaching storm, comprising:
    a) suspending a magnetic member such that the magnetic member is free to rotate through a horizontal plane, wherein a first end of the magnetic member is free to pivot away from the pull of gravity;
    b) positioning the magnetic member at a ground location proximate an approaching storm generating a magnetic field;
    c) aligning the magnetic member such that it moves through the horizontal plane and automatically pivots the first end away from the pull of gravity to point at the storm; and
    d) visually observing the realigned magnetic member.

18. The method of claim 17 wherein the magnetic member is a needle having a north pole and a south pole.

19. The method of claim 17 wherein the magnetic member is a sphere.

20. The method of claim 17 and further comprising:
    e) generating a first signal corresponding to the direction of movement of the magnetic member;
    f) using the first signal to calculate the position, speed, and direction of movement of the storm.

* * * * *